(12) United States Patent
Bacallao

(10) Patent No.: US 10,427,704 B2
(45) Date of Patent: Oct. 1, 2019

(54) UNIVERSAL COUPLING DEVICES

(71) Applicant: Walmart Apollo, LLC, Bentonville, AR (US)

(72) Inventor: Yurgis Mauro Bacallao, Centerton, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

(21) Appl. No.: 15/987,984

(22) Filed: May 24, 2018

(65) Prior Publication Data

US 2018/0362062 A1 Dec. 20, 2018

Related U.S. Application Data

(60) Provisional application No. 62/520,107, filed on Jun. 15, 2017.

(51) Int. Cl.
*B62B 3/14* (2006.01)
*H02J 7/00* (2006.01)

(52) U.S. Cl.
CPC .......... *B62B 3/1472* (2013.01); *B62B 3/1424* (2013.01); *B62B 2202/02* (2013.01); *H02J 7/0044* (2013.01); *H02J 2007/0062* (2013.01)

(58) Field of Classification Search
CPC ..... B62B 3/1472; B62B 3/1424; H02J 7/0044
See application file for complete search history.

(56) References Cited

U.S. PATENT DOCUMENTS

| | | | |
|---|---|---|---|
| 5,187,744 A * | 2/1993 | Richter | B60R 11/0241 224/553 |
| 8,979,040 B2 * | 3/2015 | Chien | F16M 13/00 248/121 |
| 9,059,591 B2 | 6/2015 | Niec et al. | |
| 9,476,439 B1 * | 10/2016 | Liao | F16B 2/12 |
| 9,707,901 B2 * | 7/2017 | Lee | B60R 11/02 |
| 9,840,264 B1 * | 12/2017 | Johnson | B62B 3/1416 |
| 9,969,450 B1 * | 5/2018 | Lu | B62J 11/00 |
| 2003/0190936 A1 * | 10/2003 | Fan | H02J 7/0044 455/573 |
| 2004/0111320 A1 | 6/2004 | Schlieffers et al. | |

(Continued)

FOREIGN PATENT DOCUMENTS

CN 205429849 U 8/2016

OTHER PUBLICATIONS

"Top 10 Best Smartphone Bike Mount Holder Reviews 2017," AllTopBrand.com, accessed Apr. 4, 2017.

(Continued)

*Primary Examiner* — Brian L Swenson
(74) *Attorney, Agent, or Firm* — Schmeiser, Olsen & Watts LLP; Timothy P. Collins

(57) ABSTRACT

A universal support clip for coupling a mobile electronic device to a shopping cart comprises a bar clamping member, which comprises a first end; a second end having a base portion constructed and arranged to accommodate a plurality of different device mount interfaces; and a body portion between the first and second ends, the body portion including a curved interior wall for receiving a portion of a handlebar of the shopping cart from the first end in an open state and for securing to the portion of the handlebar when the first end is in a closed state.

20 Claims, 6 Drawing Sheets

(56) References Cited

U.S. PATENT DOCUMENTS

| | | | |
|---|---|---|---|
| 2010/0171464 A1* | 7/2010 | Choi | B25J 5/00 |
| | | | 320/114 |
| 2014/0176062 A1* | 6/2014 | Jung | B60R 11/02 |
| | | | 320/108 |
| 2016/0036478 A1* | 2/2016 | Wong | H02J 7/0044 |
| | | | 455/573 |
| 2016/0079801 A1 | 3/2016 | Zhang et al. | |
| 2018/0034494 A1* | 2/2018 | Bacallao | H04B 1/3877 |
| 2018/0187829 A1* | 7/2018 | Bacallao | F16M 13/022 |

OTHER PUBLICATIONS

"VODOOL Bicycle Bike Mount Phone Holder Rainproof Bag Case for Cellphone GPS," Ebay.com, accessed Apr. 4, 2017.
"Shopping cart phone holder," Alibaba.com, accessed Apr. 4, 2017.
"ChargerCity iPad 3 Universal Tablet Handle Bar Microphone Stand Shopping Cart Bicycle Wheelchair Golf Push Cart Mount (Firts all standard handle bar from .75" to 1")," Amazon.com, accessed Apr. 6, 2017.

* cited by examiner

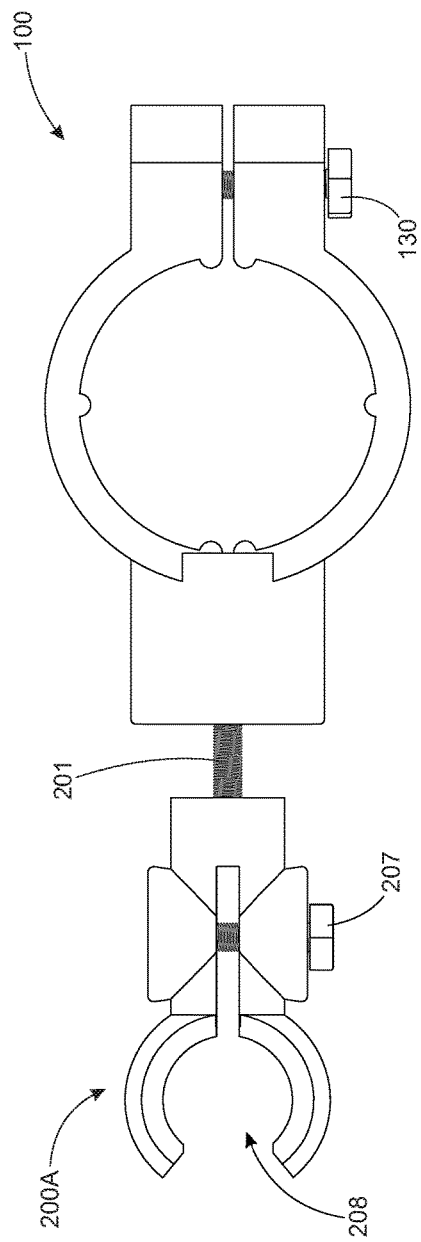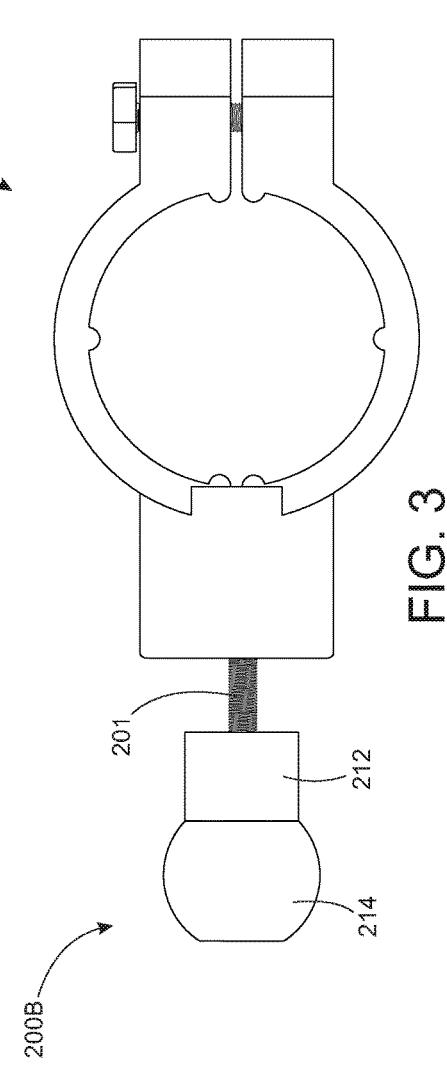

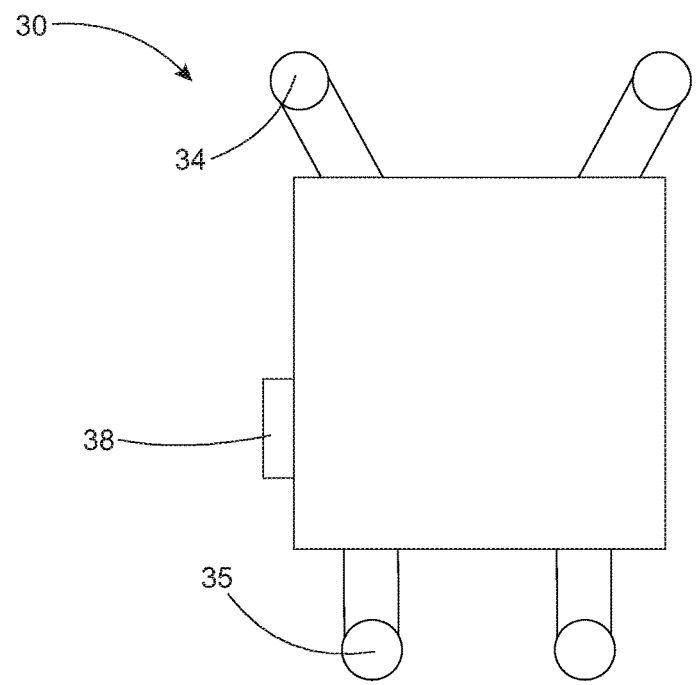
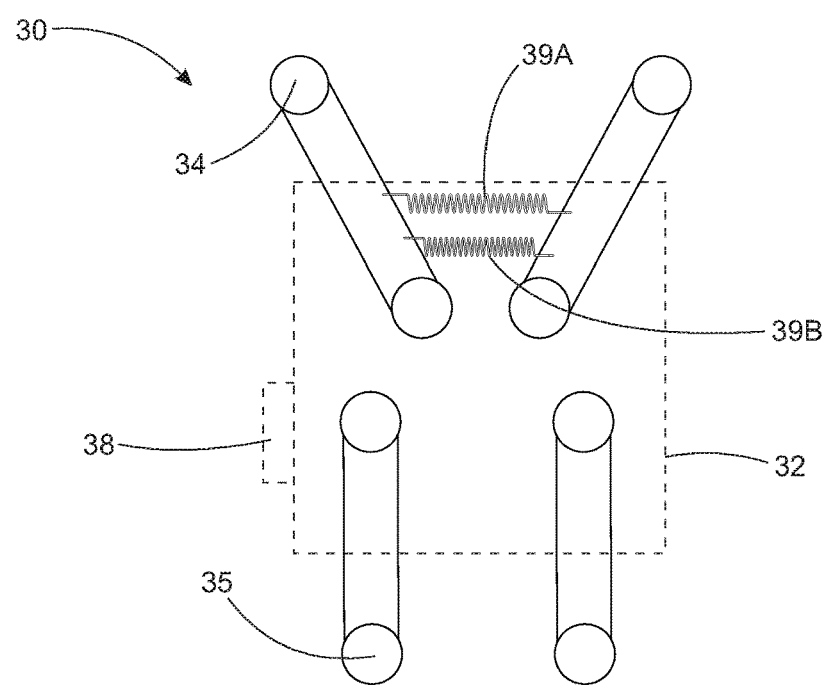
FIG. 6

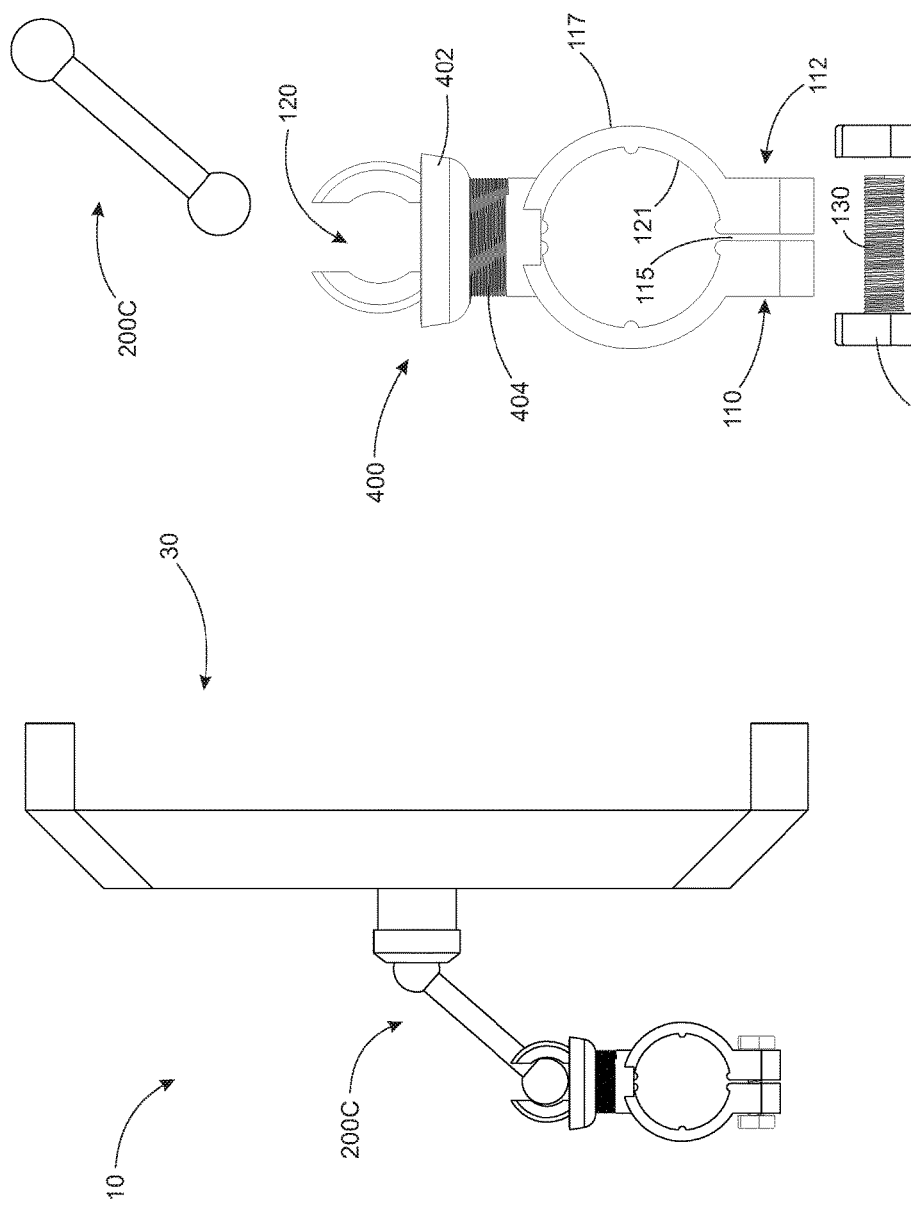

UNIVERSAL COUPLING DEVICES

RELATED APPLICATIONS

This invention claims priority to U.S. provisional patent application Ser. No. 62/520,107, filed Jun. 15, 2017 and entitled "Universal Coupling Devices for Shopping Cart", which is incorporated entirely herein by reference.

TECHNICAL FIELD

The present inventive concepts relate generally to mobile device holders and more specifically, to a universal support clip for coupling a mobile electronic device to a shopping cart, bicycle, or other tubular object.

BACKGROUND

As retail establishments modernize their computer networks to permit shoppers to use a mobile electronic device such as a smartphone or store-provided scanning device, there is a need to mount the mobile electronic device to a shopping cart that allows the shopper to participate in a shopping experience in a hands-free manner. However, smartphone handlebar clamp mounts or the like typically include a proprietary interface for mating with a specific device. There is also a related need for a mounting system to couple a mobile electronic device to a shopping cart that can accommodate a variety of different types of electronic devices, while accommodating the features of the mobile electronic device, such as allowing rotation of the electronic device while mounted on the shopping cart.

SUMMARY

In one aspect, provided is a universal support clip for coupling a mobile electronic device to a shopping cart, comprising a bar clamping member, a device mount interface, and a universal adapter. The bar clamping member comprises a first end; a second end having a base portion constructed and arranged to accommodate a plurality of different device mount interfaces; and a body portion between the first and second ends, the body portion including a curved interior wall for receiving a portion of a handlebar of the shopping cart from the first end in an open state and for securing to the portion of the handlebar when the first end is in a closed state. The device mount interface of the plurality of different device mount interfaces is at the second end of the bar coupling member for coupling the mobile electronic device to the universal support clip. The universal adapter extends from the device mount interface and mating with the base portion at the second end of the bar clamping member.

In another aspect, provided is a bar clamping member of a universal support clip for coupling a mobile electronic device to a shopping cart, comprising: a first end; a second end having a threaded base portion constructed and arranged to accommodate a plurality of different device mount interfaces, the threaded base portion constructed and arranged to mate with a universal adapter in turn attached to a device mount interface; and a body portion between the first and second ends, the body portion including a curved interior wall for receiving a portion of a handlebar of the shopping cart from the first end in an open state and for securing to the portion of the handlebar when the first end is in a closed state.

In another aspect, provided is a bar clamping member of a universal support clip for coupling a mobile electronic device to a shopping cart, comprising: a first end; a second end having a lock nut and swivel element constructed and arranged to accommodate a plurality of different device mount interfaces; and a body portion between the first and second ends, the body portion including a curved interior wall for receiving a portion of a handlebar of the shopping cart from the first end in an open state and for securing to the portion of the handlebar when the first end is in a closed state.

BRIEF DESCRIPTION OF THE DRAWINGS

Advantages of examples of the present inventive concepts may be better understood by referring to the following description in conjunction with the accompanying drawings, in which like numerals indicate like structural elements and features in various figures. The drawings are not necessarily to scale, emphasis instead being placed upon illustrating the principles of features and implementations.

FIG. 2 is a perspective view of the universal support clip of FIG. 1, where the bar clamping member is coupled to one of the device mount interfaces.

FIG. 3 is a perspective view of the universal support clip of FIG. 1, where the bar clamping member is coupled to another of the device mount interfaces.

FIG. 6 is a cutaway view of the phone holder of FIG. 5, in accordance with some embodiments.

FIG. 7A is a view of a universal support clip, in accordance with other embodiments.

FIG. 7B is a front view of the bar clamping member and swivel device mount interface of FIG. 7A separate from each other.

DETAILED DESCRIPTION OF EMBODIMENTS

Figure 1:
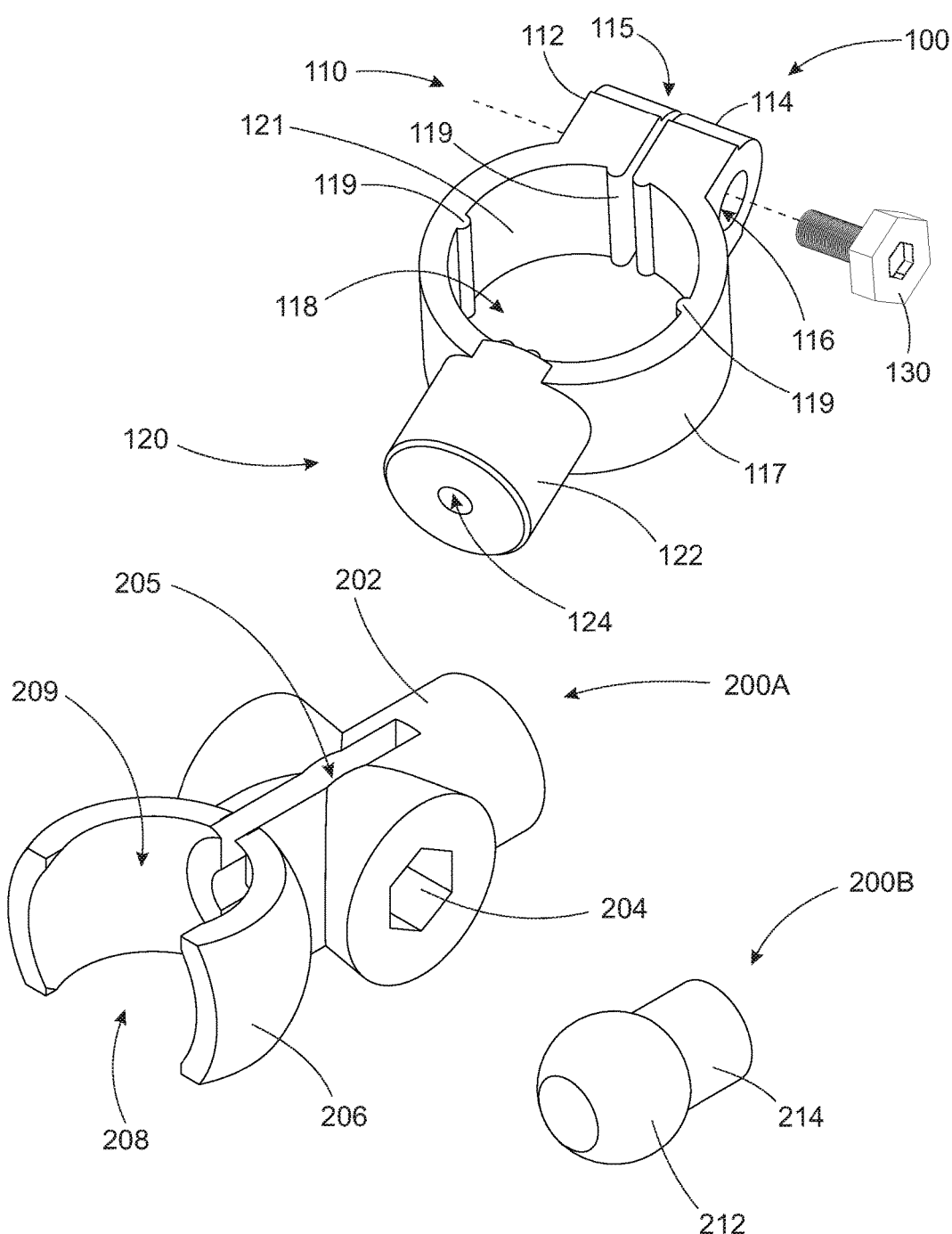
FIG. 1 is a bar clamping member of a universal support clip including a bar clamping member and two different device mount interfaces, in accordance with some embodiments.

FIG. 1 is a bar clamping member 100 of a universal support clip, in accordance with some embodiments. The bar clamping member 100 is constructed and arranged to couple to a handlebar or other tubular structure, for example, shown in FIG. 5. As shown, the bar clamping member 100 in some embodiments is removably attached to a shopping cart, but not limited thereto. For example, the bar clamping member 100 may be positioned about the handlebar of a bicycle.

The bar clamping member 100 comprises a body portion 117 having a curved interior wall 121 forming an opening 118, two outer ends 112, 114, each extending from one end 110 of the body portion 117 and separated by a gap 115, and a base portion 122 extending from the other end 120 of the body portion 117. The first end 10 can be in an open state where the gap 115 is widened to receive a handlebar or other tubular object, or a closed state where the handlebar or tubular object is secured by the body portion 117.

At the first end 110 of the body portion 117, the two outer ends 112, 114 each has a hole 116. The holes 116 are aligned with each other, i.e., extending along the same axis, so that the holes 116 can each receive a bolt 130, or screw or other elongated coupling device, which can be inserted into the holes 116. One of the outer ends, for example, 112, may have a threaded hole 116 for receiving a threaded distal end of the coupling device 130, which when threaded can result in a force applied to the outer ends 112, 114 so that they in turn move toward each other, therefore tightening or compressing the curved interior walls 121 of the bar clamping member 100 forming the opening 118 positioned about a handle or other tubular object inserted in the opening 118 of the bar clamping member 100 formed by the interior walls 121. The hole 116 of at least one outer end, for example outer end 114, may include a recess 125 or the like having a width that receives the head of the bolt 130. Although a threaded coupling device 130 is shown and described, other coupling devices may equally apply to apply a force for example to squeeze the outer ends 112, 114 together.

In some embodiments, as shown in FIG. 7B, the bolt 130 may extend through both outer ends 112, 114 so that a distal end of the bolt 130 is exposed. A nut 131 may be threaded about the exposed distal end of bolt 130 to press the outer ends 112, 114 together, resulting a force applied by the bar clamping member 100 about the handlebar 22. Although threaded coupling devices 130, 131 are shown and described, other coupling devices may equally apply to squeeze the outer ends 112, 114 together. A feature of the bar clamping member 100 is the need for a single coupling device 130, e.g., a single threaded screw, bolt, or the like for locking the bar clamping member 100 against a handle or the like. The feature of a single coupling device extending through a distal end of the bar clamping member 100 offers simplicity and ease-of-use during assembly, when coupling the bar clamping member 100 to the handlebar 22. When tightened sufficiently, the bar clamping member 100 does not rotate about the handlebar 22 and remains stationary, and therefore offers safety and longevity, when fastening different phone holders or other electronic device components to the shopping cart.

The curved interior wall 121 forming the opening 118 may have a circular, elliptical, or related shape for tightly positioning about the handle or other tubular object. In some embodiments, a plurality of protrusions 119, bumps, or the like extend from the interior wall 121 to directly contact the handle and to apply additional force and reducing the risk of undesirable rotation of the bar clamping member 100 about the handle during operation. The protrusions 119 may have compressible and/or elastic qualities so that the protrusions 119 change shape or form when pressed against the handle, and returns to an original state when no force is applied. Alternatively, or in addition, a coating or layer of a material providing friction may be bonded to, sprayed on, or otherwise adhered to the interior wall 121. This, and/or other techniques not mentioned but equally applicable, may be used to further reduce the risk of undesirable rotation of the bar clamping member 100 about the handle during operation.

In order for a handle or other tubular object to be inserted into the bar clamping member 100 so that the wall 121 can surround it, the handle or the like is inserted through the gap 115 between the outer ends 112, 114 which extends to the hole 116. The gap 115 has a predetermined width for example, about 0.16 inches, when no force is applied, for example, when the bolt 130 is not inserted. When the width of the gap 115 is reduced, i.e., less than 0.16 inches, due to the force applied by the bolt 130 and threaded unit 131, the width, circumference, or other dimension of the opening formed by the interior wall 118 is reduced by the corresponding reduction of width of the gap 115.

The base portion 122 and body portion 117 may be unitary and machined or molded from a same material. In other examples, the base portion 122 and body portion 117 are formed separately and coupled together, for example, using adhesives, coupling mechanisms such as screws, rivets, or the like. The cylindrical configuration may have a predetermined outer width such as 0.5 inch outer diameter but not limited thereto. The base portion 122 is constructed and arranged to receive a removable, replaceable, and interchangeable device mount interface 200A (FIGS. 1 and 2) or 200B (FIGS. 1 and 3), and hold it in place against the bar clamping member 100. Thus, the clamping member 100 universally accepts any smart device holder, for example, shown in FIG. 5, due to the ability to change between different device mount interfaces, for example, replace interface 200A with interface 200B. The base portion 122 is preferably unitary with the body portion 117, i.e., formed of a same material, so that the body portion 117 and outer ends 112, 114 extend from the unitary base portion 122. The material forming the outer ends 112, 114 provide some amount of elasticity or related characteristic to allow the gap 115 to expand and contract relative to the unitary base portion 122 when the coupling device 130 is used to squeeze the ends 112, 114 together. The device mount interface 200A, B (generally, 200) may include an adapter 201, for example, a threaded element, that is inserted into an opening 124 in the base portion 122. In other embodiments (not shown), the device mount interface 200 may include an opening that mates with a male adapter 201 extending from the base portion 122. The opening 124 may be threaded, for example, constructed and arranged to receive any male adapter so long as the adapter 201 has a dimension and configuration for mating with the threaded opening. In some embodiments, the threaded adapter 201 extends from the base portion 122 and the threaded opening 124 is in the interchangeable device mount interface 200.

The adapter 201 may be formed of a rigid material, such as metal, while the base portion 122 is formed of plastic or other different material. Here, the adapter 201 provides rigidity and support to prevent or reduce the risk of breaking the bar clamping member 100 during operation, for example, when a force is exerted on the device mount interface 200 by an attached device during operation when the bar clamping member 100 is coupled to a handlebar 22, for example, shown in FIG. 5, for example, using a coupling element 130 described in FIGS. 1-3.

As previously described, the universal support clip 10 may include a removable, replaceable, and interchangeable device mount interface 200 for coupling to the bar clamping member 100. The universal support clip 10 in operation coupled is between a shopping cart and a mobile electronic device, in accordance with some embodiments, for example, shown in FIG. 5

The device mount interface 200 may have different configurations. For example, as shown in FIGS. 1 and 2, the device mount interface 200A may include a proximal base 202, a mid-portion 204, and a distal end 206. The above-mentioned universal adapter 201 may extend from the base 202 for interfacing with the threaded opening 124 of the bar clamping member, or the base 202 may have a threaded hole or the like for coupling with a male element extending from the bar clamping member 100. Thus, the universal adapter 201 may extend from other of the bar clamping member 100 or the device mount interface 200A, and be threaded into the other of the bar clamping member 100 or the device mount interface 200A. A feature of the universal support clip 10 is that the universal adapter 201 provides additional rigidity, reinforcement, and strength to the support clip 10 because the universal adapter 201 is formed of metal or other material more rigid than the bar clamping member 100 and/or interface 200, and reinforces the polymer material forming the bar clamping member 100 and device mount interface 200. Other materials may equally apply, such as nylon and so on. Thus, the risk of damage or breaking of the clip 10 is reduced by the presence of the universal adapter 201, since the interior include metal elements, i.e., universal adapter 201 and/or coupling element 130 extending through damage-prone plastic elements of the clip 10.

The mid-portion 204 of the device mount interface 200A may include a gap 205 and sub-portions on either side of the gap 205, each including a hole extending therethrough for receiving a threaded bolt 207 or other elongated coupling device, similar to the bolt 130 coupled to the bar clamping member 100. The distal end 206 may have two side portions 206 that form an opening 208, which can be coupled to a mobile electronic device, such as a personal smartphone, a store-provided scanning device, and so on, for example, a holder of the mobile electronic device, for example, a bulbous male coupling 33 of a phone holder base 32 shown in FIG. 5. The opening 208 can be closed about the phone holder coupling 33, for example, a round distal end, when the gap 205 is reduced by a force caused by the coupling device 207, in a similar manner as the gap 115 and bolt 130 described with respect to the bar clamping member 100. One or two second openings 209 may also be formed between the two side portions 206, which are circular, elliptical, or otherwise curved in shape, for example, shown in FIGS. 1 and 2. The second openings 209 may be perpendicular to the central opening 208 which is at an outermost end of the distal end 206 of the device mount interface 200A. The force applied by the distal end 206 on a male round or bulbous phone holder element or the like can be controlled by the torque or force applied by the bolt 207 or other elongated coupling device inserted into the hole in the mid-portion 204 for closing or opening the gap 205.

In another example, as shown in FIGS. 1 and 3, the device mount interface 200B may include a proximal base 212 and a round distal end 214. The abovementioned universal adapter 201 may extend from the base 212 for interfacing with the threaded opening 124 of the bar clamping member, or the base 212 may have a threaded hole or the like for coupling with a male element extending from the bar clamping member 100. Thus, the universal adapter 201 may extend from other of the bar clamping member 100 or the device mount interface 200B, and be threaded into the other of the bar clamping member 100 or the device mount interface 200B.

The distal end 214 includes a male bulbous or round portion that extends from the proximal base 212, and is constructed and arranged to mate with a female connector of a mobile electronic device, such as a personal smartphone, a store-provided scanning device, and so on, or more specifically, a holder of the mobile electronic device, for example, a holder of the mobile electronic device, for example, a female coupling (not shown) of a phone holder base 32 shown in FIG. 7. In this example, the mobile device holder can swivel or otherwise rotate about the round proximal base 212 which remains stationary due to its coupling arrangement with the bar clamping member 100 as shown in FIG. 3.

Figure 4:
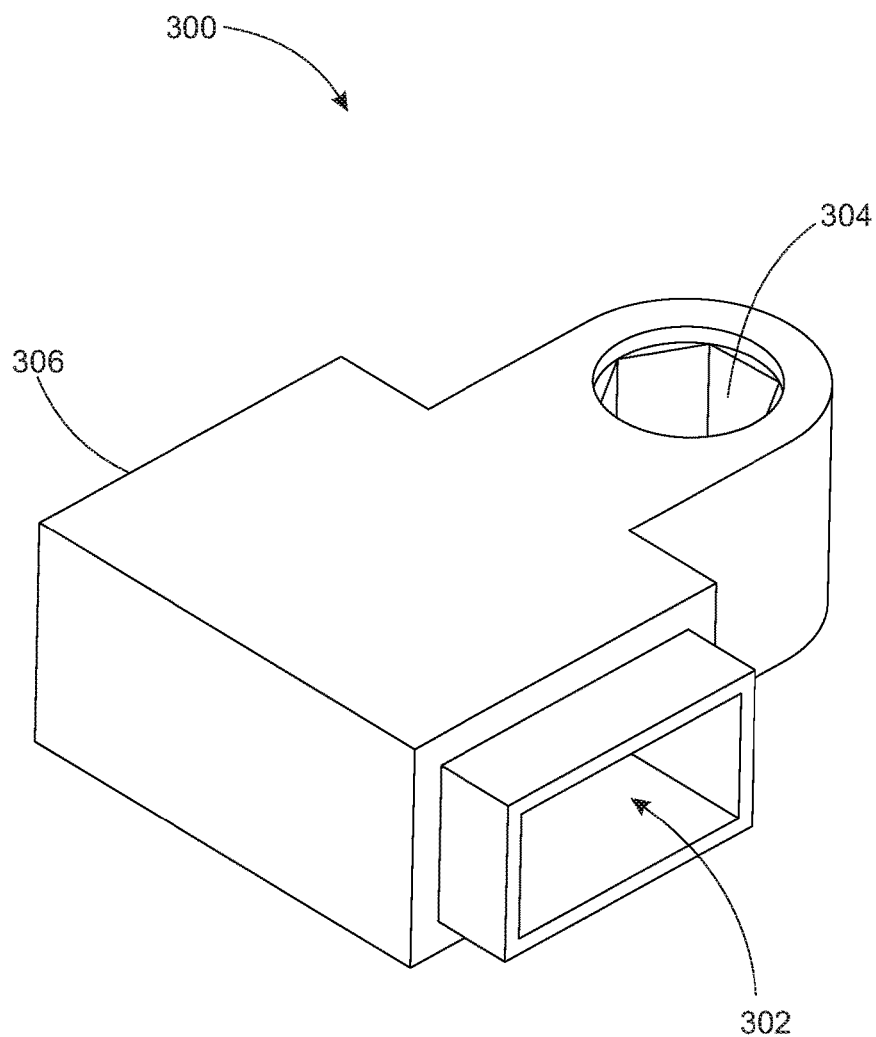
FIG. 4 a perspective view of a charging device, in accordance with some embodiments.

FIG. 4 a perspective view of a charging device 300, in accordance with some embodiments. In some embodiments, the charging device 300 includes a USB connector 302, a mounting interface 304, and a wire insert 306 (not shown but identified in FIG. 4). Also not shown is the interior of the charging device 300, which includes pin-to-pin conversion elements for exchanging power, data, and/or other signals between a conductive wire extending from a battery or other power source and received at the wire insert 306 and an electronic device, such as a USB cable of an electronic device, electrically and removably coupled to the USB connector 302. The wire insert 306 may be a male or female connector for electronically mating with a connector of the conductive wire received from the battery or other charging source, or the wire insert 306 may include exposed conduits for directly coupling with individual wires of the received conductive wire.

Figure 5:
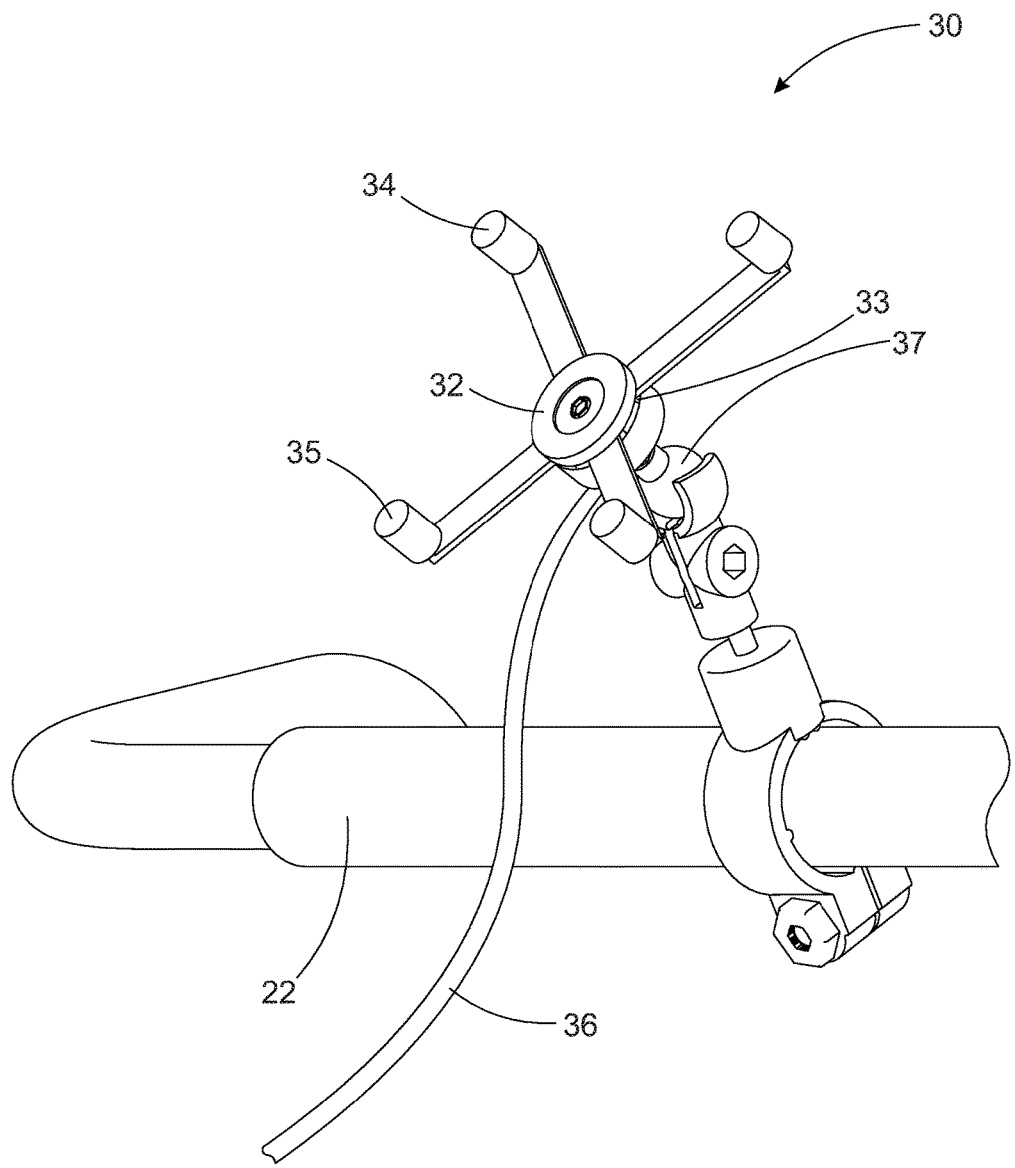
FIG. 5 is a view of a universal support clip of FIGS. 1-4 in operation coupled between a shopping cart and a phone holder for a mobile electronic device, in accordance with some embodiments.

The electronic device may be a smartphone, scanning device, or other mobile device positioned in a phone holder 30, for example, shown in FIG. 5, or a separate mobile device, for example, held in the hand of a user who operates the device by inserting a USB cable extending from the mobile device into the USB connector 302. In this example, another mobile device may be positioned in the phone holder 30, but receives a source of power via a different USB port, for example, a charging port 38 located on the phone holder itself 30, whereby two electronic devices can independently and simultaneously be charged. Thus, a user has the option of using the charging device 300 to charge a personal mobile device, a store-provided mobile device, or both.

Referring again to FIG. 5, a device mount interface 200 shown in FIGS. 1-3 is used to attach between a universal support clip 10 and a phone holder 30 or the like, which includes a base 32 and male or female coupling 33 that interfaces with the device mount interface 200.

FIG. 6 is a cutaway view of the phone holder 30 of FIG. 5, in accordance with some embodiments. The phone holder 30 comprises a base 32, a coupling 33, first and second tension legs 34, first and second phone support legs 35, first and second grooves 37 in the base 32 where the tension legs 34 can move, a charging port 38 coupled to the charger 300 shown in FIG. 4, and a high tension spring 39A and low tension spring 39B in the base 32 coupled between the two tension legs 34, for providing a force against a phone or related mobile device inserted between the tension legs 34. A conductive cable, wire, or the like, may extend directly from the phone holder 300 to a battery or other charging source. Referring again to FIG. 5, a wire 36 may connect to a battery backup or the like that in turn is connected to a charging station located at one of the shopping cart wheels for providing a source of alternative power produced by a shopper moving the cart. Thus, in some embodiments, a battery may be connected to a charging device that receives power from energy produced by motion of the shopping cart wheels, or from another alternative source, such as solar or wind energy device, which in turn charges the battery. The battery in turn can be used to provide power directly to the phone holder 30 which in turn includes a port that interfaces with a mobile device positioned in the phone holder 30 and/or provide power to the charging device 300 described with reference to FIG. 4.

FIG. 7A is a view of a universal support clip 10, in accordance with other embodiments. FIG. 7B is a front view of the bar clamping member 400 and swivel device mount interface 200C of FIG. 7A separate from each other.

The bar clamping member 400 comprises a body portion 117 and base portion 122 similar to or the same as those of the bar clamping member 100 of FIGS. 1-3, and details are therefore not repeated due to brevity. A key difference between the bar clamping member 400 of FIGS. 7A and 8B and the bar clamping member 100 of FIGS. 1-3 is that the bar clamping member 400 includes a lock nut 402 and swivel element 404 at the end 120 opposite the end 110 having the outer ends 112, 114, instead of a base portion 122 with a universal opening 124. The lock nut 402 when rotated about the body portion 117 can adjust the amount of tension or other force on the swivel element 404. The swivel element 404 is constructed and arranged to receive a bulbous end of an interchangeable device mount interface 200C. The device mount interface 200C as shown may have a round or bulbous first and second end. In other embodiments, one end is bulbous for positioning in the swivel element 404, and the other end may have a different shape, size, or configuration, for example, configured to receive device mount interface 200A shown in FIG. 1.

During operation, as shown in FIG. 7A, the universal support clip 10 has two swivel locations, each allowing multiple degrees of freedom. The first swivel location as at swivel element 404. The second swivel location as at the other end of the device mount interface 200C mating with the phone holder 30 of FIG. 5.

What is claimed is:

1. A universal support clip for coupling a mobile electronic device to a shopping cart, comprising:
   a bar clamping member, comprising:
      a first end having a gap;
      a second end opposite the first end, the second end having a unitary single piece base portion constructed and arranged to accommodate a plurality of different device mount interfaces, a center of the base portion including an opening, the gap along a same axis as the opening; and
      a body portion between the first and second ends, the body portion including a curved interior wall for receiving a portion of a handlebar of the shopping cart from the first end in an open state and for securing to the portion of the handlebar when the first end is in a closed state;
   a device mount interface of the plurality of different device mount interfaces at the second end of the bar clamping member for coupling the mobile electronic device to the universal support clip; and
   a universal adapter extending from the device mount interface and mating with the opening in the center of the base portion at the second end of the bar clamping member.

2. The universal support clip of claim 1, wherein the first end of the bar clamping member comprises:
   a first outer end;
   a second outer end adjacent the first outer end;
   the gap between the first and second outer ends that expands to transfer the handlebar portion to the curved interior wall, the handlebar of the shopping cart inserted through the gap in the open state to the interior wall of the body portion;
   a first hole in the first outer end;
   a second hole in the second outer end that is positioned along a same axis as the first hole.

3. The universal support clip of claim 2, wherein the first outer end includes a first flange, the second outer end includes a second flange, the first hole extends through the first flange, the second hole extends through the second flange, and wherein the second and the universal support clip further comprises a coupling mechanism positioned in the first and second holes of the first and second flanges, respectively, and applies a force to reduce a width of the gap.

4. The universal support clip of claim 3, wherein the coupling mechanism includes a single elongated element having a set of threads that extends through the first and second holes of the first and second outer ends, respectively, to lock the support clip by applying a force to the portion of the handlebar to reduce a width of the gap between the first and second ends.

5. The universal support clip of claim 3, wherein the gap expands relative to the unitary base portion at the first end of the bar clamping member and the body portion continues to extend from the base at the second end of the bar clamping member when a force is applied to the first and second flanges to provide for the open state, and wherein the gap contracts relative to the unitary base portion when a first is applied to the first and second flanges by the coupling mechanism to provide the closed state.

6. The universal support clip of claim 3, wherein the coupling mechanism is a screw that mates with the threaded opening in the base of the bar clamping member.

7. The universal support clip of claim 6, wherein the screw is formed of metal and the base of the bar clamping member is formed of plastic, and the metal screw provides rigidity and support to prevent breaking the bar clamping member.

8. The universal support clip of claim 1, wherein the universal adapter includes a material having more rigid characteristics than the bar clamping member, and that provides structural reinforcement to the support clip when coupled between the device mount interface and bar clamping member.

9. The universal support clip of claim 8, wherein the universal adapter includes a metal and each of the device mount interface and bar clamping member includes a plastic.

10. The universal support clip of claim 1, wherein the device mount interface includes a threaded portion that is inserted into a threaded opening in the base portion.

11. The universal support clip of claim 1, wherein the device mount interface has a male bulbous or round portion from which the universal adapter extends, the bulbous or round portion configured for coupling to a female coupling of a mobile device holder of the mobile electronic device.

12. The universal support clip of claim 1, wherein the device mount interface has a clip from which the universal adapter extends, the clip configured for coupling to a male coupling of a mobile device holder of the mobile electronic device.

13. A bar clamping member of a universal support clip for coupling a mobile electronic device to a shopping cart, comprising:
   a first end having a gap;
   a second end opposite the first end, the second end having a unitary single piece and base portion constructed and arranged to accommodate a plurality of different device mount interfaces, a center of the base portion including a threaded opening, the gap along a same axis as the opening, the threaded opening in the center of the base portion constructed and arranged to mate with a universal adapter in turn attached to a device mount interface; and
   a body portion between the first and second ends, the body portion including a curved interior wall for receiving a portion of a handlebar of the shopping cart from the first end in an open state and for securing to the portion of the handlebar when the first end is in a closed state.

14. The bar clamping member of claim 13, wherein the first end of the bar clamping member comprises:
   a first outer end;
   a second outer end adjacent the first outer end;
   the gap between the first and second outer ends that expands to transfer the handlebar portion through the gap in the open state to the curved interior wall;
   a first hole in the first outer end; and
   a second hole in the second outer end that is positioned along a same axis as the first hole.

15. The bar clamping member of claim 14, wherein the first outer end includes a first flange, the second outer end includes a second flange, the first hole extends through the first flange, the second hole extends through the second flange, and wherein the second and the universal support clip further comprises a coupling mechanism positioned in the first and second holes of the first and second flanges, respectively, and applies a force to reduce a width of the gap.

16. The bar clamping member of claim 15, wherein the coupling mechanism includes a single elongated element having a set of threads that extends through the first and second holes of the first and second outer ends, respectively, to lock the support clip by applying a force to the portion of the handlebar to reduce a width of the gap between the first and second ends.

17. The bar clamping member of claim 15, wherein the coupling mechanism is a screw that mates with a threaded opening in the base of the bar clamping member, and wherein the screw is formed of metal and the base of the bar clamping member is formed of plastic, and the metal screw provides rigidity and support to prevent breaking the bar clamping member.

18. The bar clamping member of claim 13, wherein the universal adapter includes a material having more rigid characteristics than the bar clamping member, and that provides structural reinforcement to the support clip when coupled between the device mount interface and bar clamping member.

19. A bar clamping member of a universal support clip for coupling a mobile electronic device to a shopping cart, comprising:
   a first end having a gap;
   a second end opposite the first end, the second end having a lock nut and swivel element constructed and arranged to accommodate a plurality of different device mount interfaces, the gap along a same axis as center of the lock nut and swivel element; and
   a body portion between the first and second ends, the body portion including a curved interior wall for receiving a portion of a handlebar of the shopping cart from the first end in an open state and for securing to the portion of the handlebar when the first end is in a closed state.

20. The bar clamping member of claim 19, wherein the first end of the bar clamping member comprises:
   a first outer end;
   a second outer end adjacent the first outer end;
   the gap between the first and second outer ends that expands to transfer the handlebar portion to the curved interior wall;
   a first hole in the first outer end; and
   a second hole in the second outer end that is positioned along a same axis as the first hole.

* * * * *